(12) United States Patent
Ishikawa et al.

(10) Patent No.: US 8,334,989 B2
(45) Date of Patent: Dec. 18, 2012

(54) PRINTING DEVICE AND METHOD FOR PARALLEL PROCESSING OF DATA

(75) Inventors: Takuya Ishikawa, Kanagawa (JP); Tsuyoshi Miyamura, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 12/698,379

(22) Filed: Feb. 2, 2010

(65) Prior Publication Data

US 2010/0253972 A1 Oct. 7, 2010

(30) Foreign Application Priority Data

Apr. 7, 2009 (JP) .................................. 2009-93340

(51) Int. Cl.
*G06F 15/00* (2006.01)
*G06F 3/12* (2006.01)
*G06K 1/00* (2006.01)

(52) U.S. Cl. ........................................ 358/1.13; 358/1.1

(58) Field of Classification Search .................. None
See application file for complete search history.

(56) References Cited

U.S. PATENT DOCUMENTS 6,587,655 B2 * 7/2003 Maekawa ........................ 399/82

FOREIGN PATENT DOCUMENTS

| JP | 07-104987 | 4/1995 |
|----|-----------|--------|
| JP | 07-237510 | 9/1995 |
| JP | 8154171 A | 6/1996 |
| JP | 08-297560 | 11/1996 |
| JP | 10100512 A | 4/1998 |
| JP | 10337932 A | 12/1998 |
| JP | 11-147344 | 6/1999 |
| JP | 11-259644 | 9/1999 |

* cited by examiner

*Primary Examiner* — Douglas Tran
(74) *Attorney, Agent, or Firm* — Douglas A. Lashmit; Hoffman Warnick LLC

(57) ABSTRACT

A computer-implemented printing device for converting a drawing command acquired from a computer into an intermediate language by parallel processing. The printing device includes: an intermediate language code generation unit that acquires a drawing command and printing data written in a page description language and converts it into an intermediate language code; an intermediate language processing unit that processes the intermediate language code generated by the intermediate language code generation unit to generate raster data; and a printing mechanism that performs printing processing based on the raster data generated by the intermediate language processing unit. A computer-implemented control device, control method, and program product is provided for executing the functions performed by the units of the printing device.

15 Claims, 15 Drawing Sheets

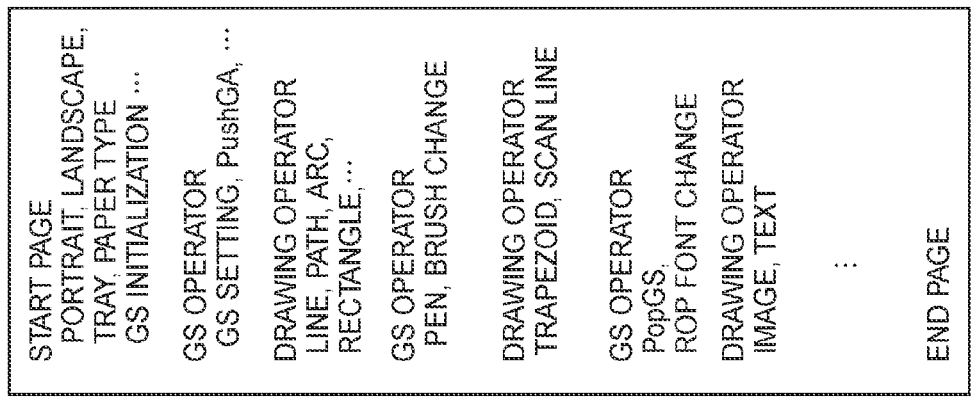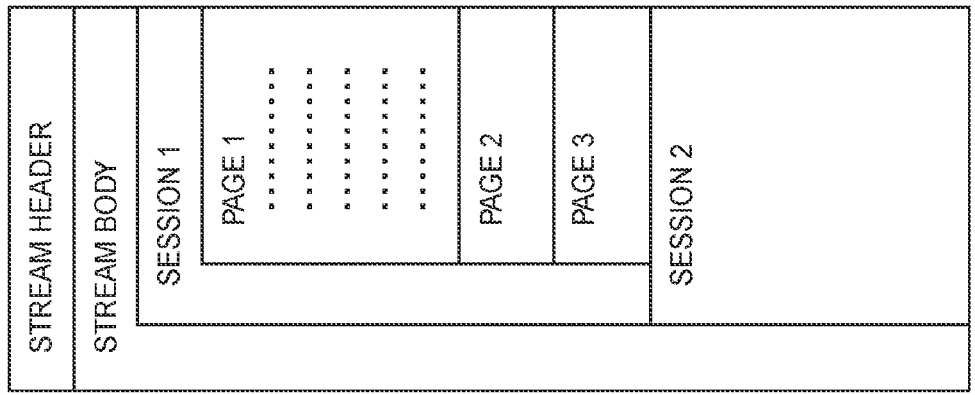
FIG. 2

| | | REQUIRED MEMORY SIZE OF EACH OPERATOR | | EXPECTED MEMORY USAGE OF EACH BLOCK | |
|---|---|---|---|---|---|
| FIRST BLOCK GS1 { | NewPath SetClipToPage SetClipRectangle SetCursor | 100 | | 1120 | |
| D1 { | BeginImage ReadImage EndImage | 10 1000 10 | | | |
| SECOND BLOCK GS2 { | NewPath SetROP SetPenSource SetBrushSource SetClipToPage SetCursor | 100 | | 820 | |
| D2 { | BezierPath BezierPath BezierPath BezierPath BezierPath BezierPath BezierPath BezierPath BezierPath BezierPath BezierPath LineRelPath BezierPath BezierPath CloseSubPath PaintPath | 50 50 50 50 50 50 50 50 50 50 50 10 50 50 10 50 | | | |
| THIRD BLOCK GS3 { | NewPath SetCursor | 100 | | 160 | |
| D3 { | LineRelPath LinePath LinePath CloseSubPath | 20 10 10 20 | | | |
| FOURTH BLOCK GS4 { | SetClipReplace SetCursor | 100 | | 1520 | |
| D4 { | BezierPath BezierPath BezierPath ⋮ | 50 50 50 ⋮ | | | |

*FIG. 6*

MEMORY USE EXPECTATION TABLE

| NAME | | EXPECTED MEMORY USAGE |
|---|---|---|
| GS OPERATOR | ...... | 1024 |
| DRAWING OPERATOR | Rectangle | 300 |
| | BezierPath | 200 |
| | Line | 256 |
| | ⋮ | ⋮ |
| | ⋮ | ⋮ |

PRINTING DEVICE AND METHOD FOR PARALLEL PROCESSING OF DATA

CROSS-REFERENCE TO RELATED APPLICATIONS

This application claims priority under 35 U.S.C. §119 to Japanese Patent Application No. 2009-93340 filed Apr. 7, 2009, the entire contents of which are incorporated by reference herein.

BACKGROUND OF THE INVENTION

1. Field of the Invention

The present invention relates to a printing device that generates an intermediate language code from a drawing command and printing data, and generates raster data from the intermediate language code for a printout, and a control method thereof.

2. Description of the Related Art

To speed up data processing, speeding up a CPU, or using a multiprocessor or multi-core processor to implement parallel processing can be considered. In order to improve the process speed in parallel processing, it is important in terms of how to select processes to be executed in parallel and how to set and allocate a processing unit.

A drawing process of a printing device normally includes the following two steps:
(1) a step of converting a drawing command acquired from a PC or the like into intermediate language; and
(2) a step of converting the intermediate language into final drawing data (raster data).

The technique described in Japanese Patent Application Publication No. H8(1996)-154171 (Patent Document 1) enables the implementation of high-speed processing while ensuring the order of drawing to a frame buffer, thus acquiring final output data. This is a technique of parallel processing concerning the above step (2).

The technique described in Japanese Patent Application Publication No. H10(1998)-337932 (Patent Document 2) determines whether parallel processing is possible for image processing based on whether the image processing depending on a position of image data and a pixel value, and reconfigures hardware based on a determination as to whether to execute the image processing by parallel processing. This is a technique covering the whole processing of creating drawing data from data written in PDL (page description language) irrespective of the above steps (1) and (2).

The technique described in Japanese Patent Application Publication No. H10(1998)-100512 (Patent Document 3) individually performs parallel-processing of printing data transmitted from a plurality of sources to convert them into individual intermediate language data, and prints an image in the unit of one page in the order of obtaining the intermediate language data. This is a technique of conducting parallel processing in the units of jobs concerning the above step (1).

In step (1) of the two steps of the above-stated drawing process by a printing device, the previous and the subsequent commands in the order of the drawing commands have a high dependence, and therefore it is not easy to implement this step by parallel processing. The technique of the above-described Patent Document 1 addresses the processing of step (2) for parallel processing and does not consider the processes of step (1) in parallel. The technique of the above-described Patent Document 2 addresses the whole processing of creating drawing data from data written in PDL, which includes a part corresponding to step (1) but requires special hardware for implementation, thus leading to an increase of cost. The technique of the above-described Patent Document 3 addresses step (1). However, this technique intends to, in response to a plurality of job execution requests, execute them in parallel, and therefore the applicable situation is extremely limited.

Therefore, what is needed is to address the processing of the above-stated step (1) to convert a drawing command acquired from a PC or the like into intermediate language, and to execute commands in one or more jobs by parallel processing, thus speeding up the processing.

SUMMARY OF THE INVENTION

According to one embodiment of the present invention, a computer-implemented printing device is provided for receiving a drawing command and printing data to produce a printout. The printing device includes: an intermediate language generation unit that acquires a drawing command and printing data written in a page description language and converts the drawing command and printing data into an intermediate language code; an intermediate language processing unit that processes the intermediate language code generated by the intermediate language generation unit to generate raster data; and a printing mechanism that performs printing processing based on the raster data generated by the intermediate language processing unit. The intermediate language generation unit divides the drawing command into units of blocks, where each block includes a group of drawing operators and graphic state operators, based on a dependence between the units of blocks of the drawing operators and graphic state operators, and performs parallel processing in the units of blocks to generate the intermediate language code.

According to another embodiment of the present invention, a computer-implemented control device is provided for a computer-implemented printing device that receives a drawing command and printing data to produce a printout. The control device includes: an intermediate language generation unit that acquires a drawing command and printing data written in a page description language and converts the drawing command and printing data into an intermediate language code; and an intermediate language processing unit that processes the intermediate language code generated by the intermediate language generation unit to generate raster data for printing processing. The intermediate language generation unit divides the drawing command into units of blocks, where each block of the units of blocks includes a group of drawing operators and graphic state operators, based on a dependence between the units of blocks of the drawing operators and graphic state operators, and performs parallel processing in the units of blocks to generate the intermediate language code.

According to still another embodiment of the present invention, a computer-implemented control method is provided for a computer-implemented printing device that receives a drawing command and printing data to produce a printout. The method includes the steps of: acquiring a drawing command and printing data written in a page description language; converting the acquired drawing command and printing data into an intermediate language code; processing the generated intermediate language code to generate raster data; and controlling a printing mechanism based on the generated raster data to perform printing processing. The step of converting the acquired drawing command and printing data into the intermediate language code includes the steps of: dividing the drawing command in units of blocks, where each block of the units of blocks includes a group of drawing operators and graphic state operators, based on a dependence between the units of blocks of the drawing operators and graphic state operators; and performing parallel processing in the units of blocks to generate the intermediate language code.

According to yet another embodiment of the present invention, a computer program product is provided for causing a computer to implement functions of the above-stated control device and to execute the steps of the above-stated control method.

The embodiments of the present invention as stated above converts a drawing command acquired from a PC into intermediate language, and executes commands in one or more jobs by parallel processing, thus speeding up the processing.

BRIEF DESCRIPTION OF THE DRAWINGS

FIG. 2 illustrates an exemplary configuration of a drawing command according to embodiments of the present invention.

FIG. 6 illustrates a required memory size of each operator and an expected memory usage of each block in the drawing command of FIG. 4.

FIG. 8-1 is a flowchart illustrating the overall flow of an operation by a control unit according to embodiments of the present invention.

FIG. 8-2 is a flowchart illustrating the overall flow of an operation by a control unit according to embodiments of the present invention.

DETAILED DESCRIPTION OF PREFERRED EMBODIMENTS

It will be readily understood that embodiments of the present invention, as generally described and illustrated in the figures herein, may be arranged and designed in a wide variety of different configurations in addition to the described preferred embodiments. Thus, the following detailed description of the embodiments of the present invention, as represented in the figures, is not intended to limit the scope of the invention, as claimed, but is merely representative of selected preferred embodiments of the invention. The following description is intended only by way of example, and illustrates certain selected preferred embodiments of the invention as claimed herein.

System Configuration

Figure 1:
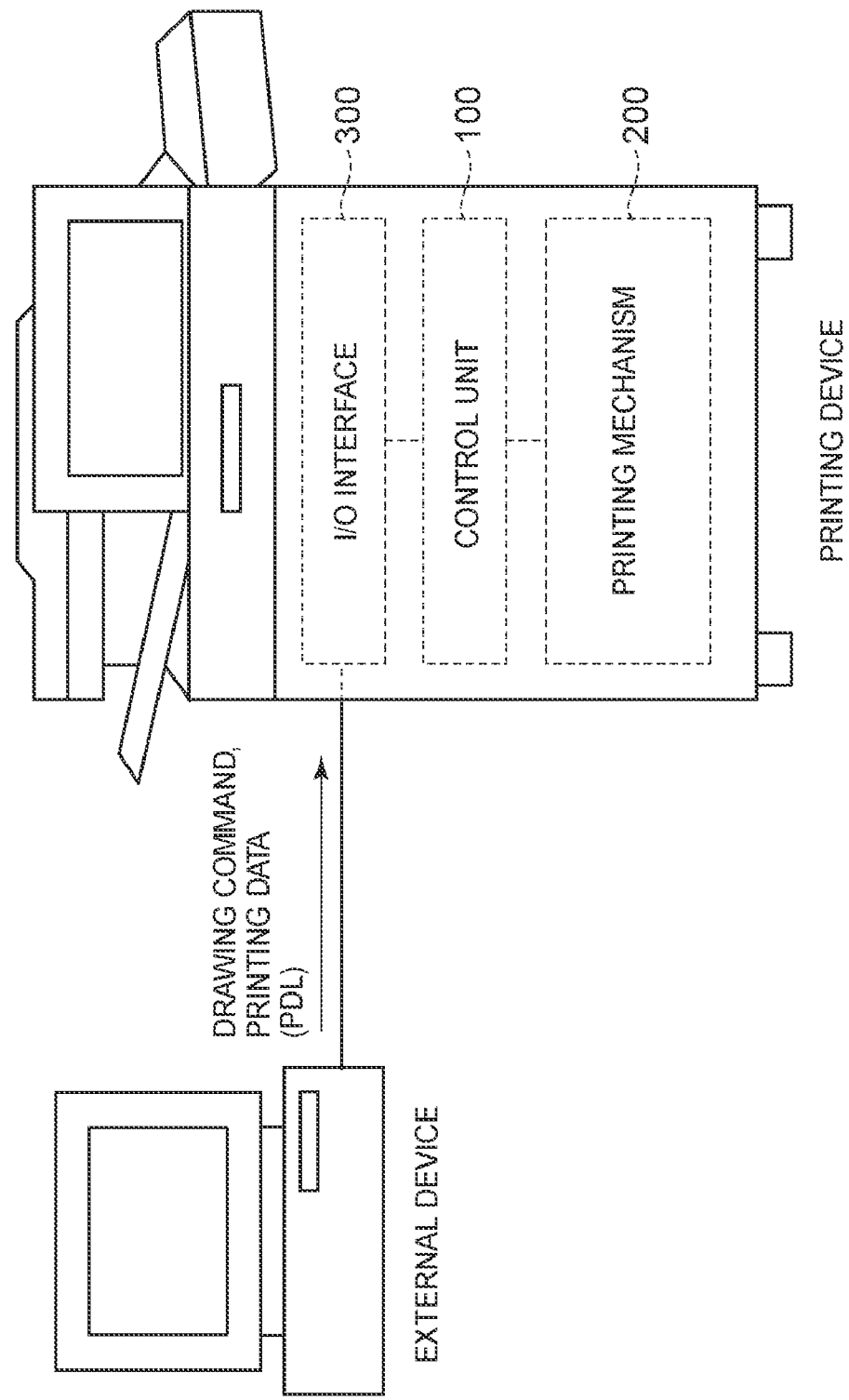
FIG. 1 illustrates an exemplary configuration of a printing device according to embodiments of the present invention.

Referring to FIG. 1, an exemplary configuration of a printing device according to embodiments of the present invention is shown. As illustrated in FIG. 1, the printing device of the present embodiment includes a control unit 100 that controls an operation of the device; a printing mechanism 200 that forms an image on paper or the like as a printing medium using an image forming material such as toner or ink; and an I/O interface 300 to exchange data with an external device such as a personal computer.

The control unit 100 is implemented by a CPU, a ROM that stores programs executed by the CPU, and a ROM as work memory. The control unit 100 of the present embodiment includes a multiprocessor equipped with a plurality of CPUs. This control unit 100 controls various processing such as an operation of the printing mechanism 200 and data exchange performed via the I/O interface 300, based on programs installed beforehand and various settings. The control unit 100 further conducts image processing to generate a print image in accordance with a drawing command and printing data received via the I/O interface 300.

The printing mechanism 200 forms (prints) documents and images generated by the control unit 100 on a printing medium such as paper using an image forming material such as toner or ink. In the embodiment of the present invention, the printing method is not limited. That is, the printing mechanism 200 can be configured by using various forms of printing means such as of electrophotography type, ink jet type and thermal type.

The I/O interface 300 connects to an external device such as a personal computer via a network or the like. Then, the I/O interface 300 receives from the external device connected therewith a drawing command and printing data written in PDL (Page Description Language) such as PCL-XL and sends the same to the control unit 100.

Configuration of Drawing Command

The following describes the configuration of a drawing command. A drawing command is written in an existing PDL such as PCL-XL, which does not have a special configuration according to the embodiment of the present invention.

Figures 1, 8:
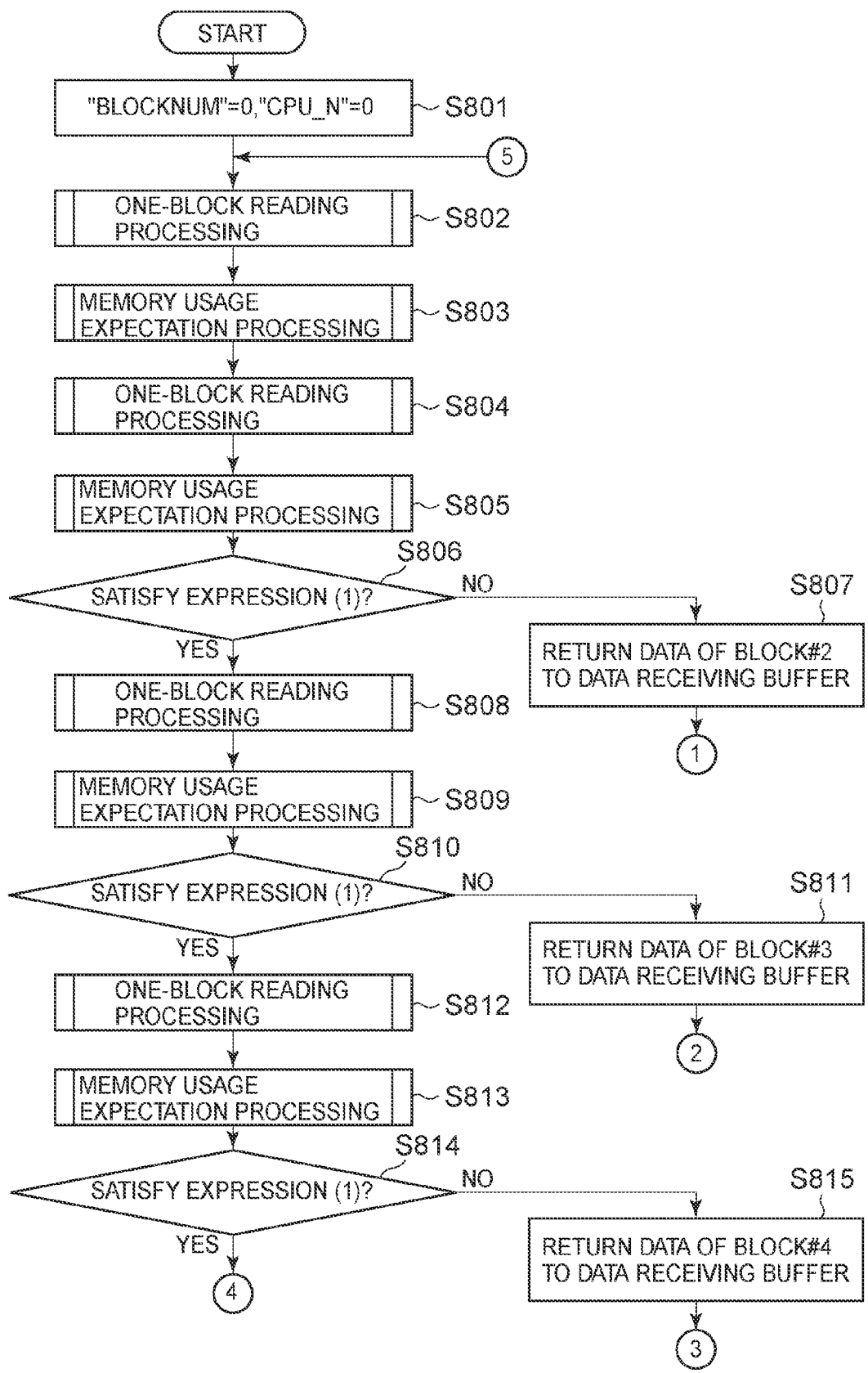
Figures 2, 8:
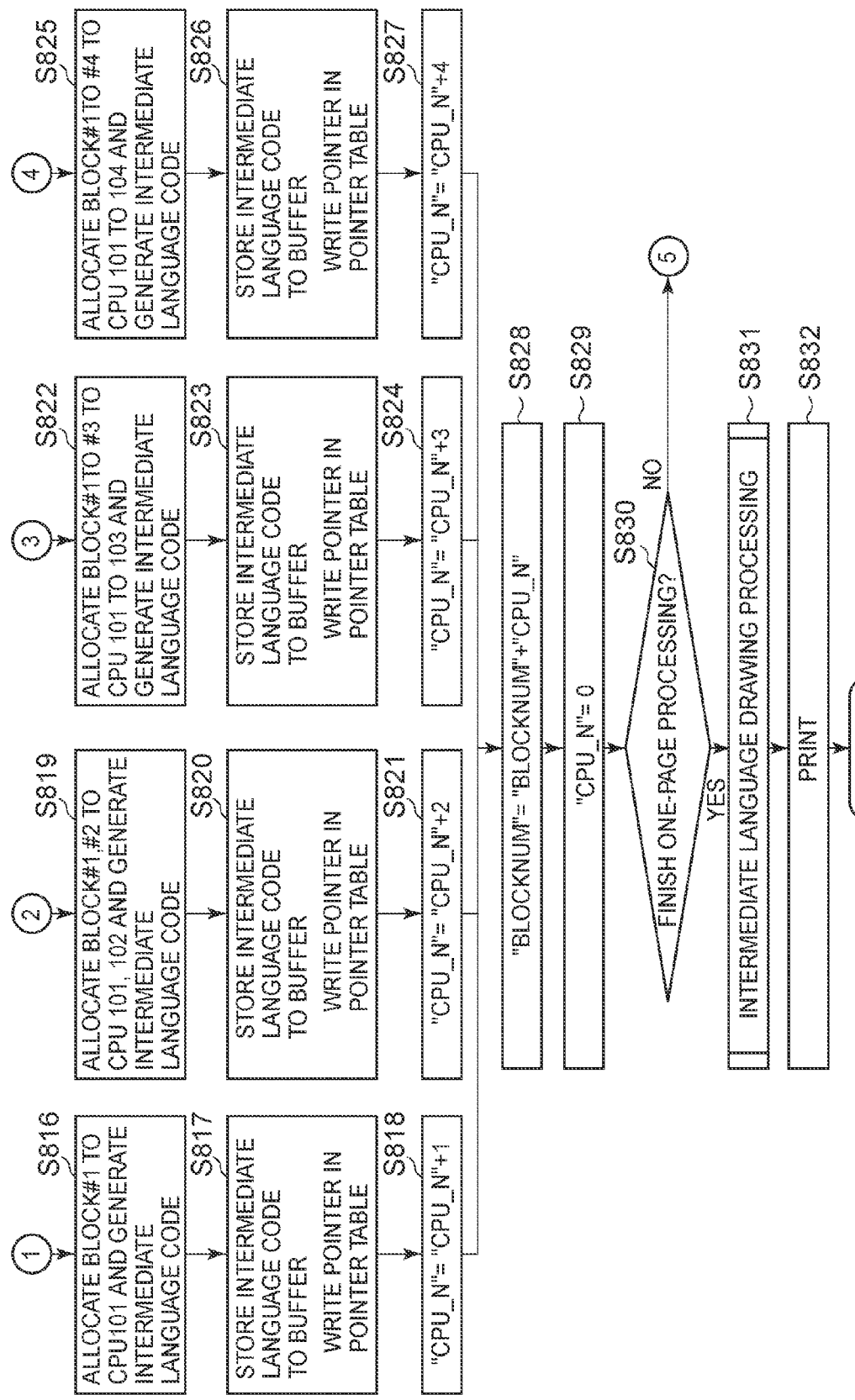

FIG. 2 illustrates an exemplary configuration of a drawing command. FIG. 2A schematically illustrates the overall configuration of a drawing command configuring one job, and FIG. 2B illustrates the configuration of a drawing command in one page.

As illustrated in FIG. 2A, the drawing command is configured with a stream header and a stream body. The stream body is sectioned into sessions, each of which is sectioned into pages.

As illustrated in FIG. 2B, a drawing command in each page is configured with commands of start page, drawing operators, graphic state (GS) operators, and end page. The start page is a command to perform initial setting of the page. The drawing operators and the GS operators are commands to perform drawing. The end page is a command to indicate the termination of the page. The following describes the respective commands configuring a drawing command as "operators" in order to distinguish them from a "drawing command" indicating the command group as a whole. Herein, the "operator" is a term used in PCL-XL, but embodiment of the present embodiment is not limited to PCL-XL only. They are simply referred to by different terms in order to distinguish the whole command group and the respective commands.

Of the operators to perform drawing, a drawing operator designates the specific drawing contents (images) such as a line, a figure and text. Operators other than the drawing operators are collectively called graphic state (GS) operators. These GS operators include an operator to designate drawing settings (pen, brush, fonts of text and the like), which is called a graphic state.

Of the above-described drawing commands in each page, a group of a GS operator and a drawing operator describes the drawing contents. In the embodiment of the present invention, such a group of a GS operator and a drawing operator is set as a block, and allocation is performed to a plurality of CPUs in the units of the blocks, thus executing parallel processing of the drawing command. The procedure to block division and allocation to each CPU for parallel processing will be described later.

Functional Configuration of Control Unit 100

Figure 3:
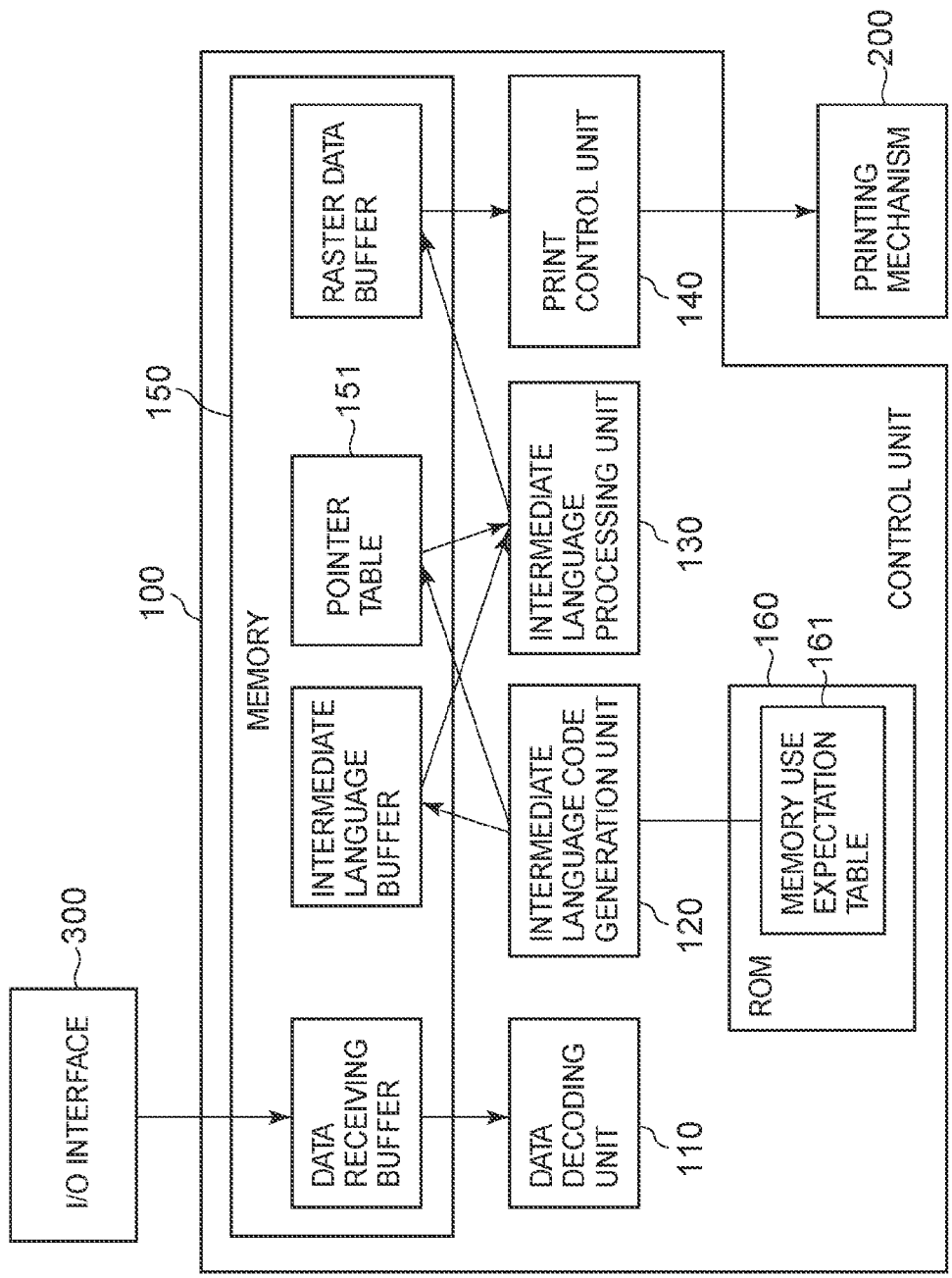
FIG. 3 illustrates a functional configuration of a control unit according to embodiments of the present invention.

FIG. 3 illustrates a functional configuration of the control unit 100. The control unit 100 includes a data decoding unit 110, an intermediate language code generation unit 120, an intermediate language processing unit 130, and a print control unit 140. These functions are implemented, for example, by loading a program stored in a ROM by a CPU for execution. A memory 150 is implemented by the above-described RAM, for example, which is used for data receiving buffer, intermediate language buffer, and raster data buffer. In the embodiment of the present invention, other work areas of the memory 150 keeps a pointer table 151 described later. A ROM 160 keeps a memory use expectation table 161 described later.

The data decoding unit 110 decodes a drawing command received via the I/O interface 300 and kept in the data receiving buffer (memory 150), and decomposes the same into individual operator lines. Then the data decoding unit 110 sends the drawing command decomposed into the individual operator levels to the intermediate language code generation unit 120.

The intermediate language code generation unit 120 receives the drawing command from the data decoding unit 110, and divides it into each block as a group of operators that can be processed in parallel. Then, the respective blocks are allocated to a plurality of CPUs, and each CPU generates a code line (hereinafter called an intermediate language code) in intermediate language from operators of the blocks allocated thereto. The thus generated intermediate language code is stored in the intermediate language buffer (memory 150). The detailed processing of dividing the drawing command into blocks and allocating them to the CPUs will be described later. The processing of generating an intermediate language code from operators of the respective blocks is similar to the process of generating intermediate language in the existing printing device. Since the intermediate language code is generated by parallel processing in the embodiment of the present, it is divided into blocks. Thus, the intermediate language code generation unit 120 creates a pointer table 151 to manage the order of the respective blocks in the original drawing command, and stores the same in the memory 150. The pointer table 151 will be described later in detail.

The intermediate language processing unit 130 reads out an intermediate language code from the intermediate language buffer in the order designated by the pointer table 151, and converts the same into raster data. The generated raster data is stored in the raster data buffer (memory 150).

The print control unit 140 reads out the raster data from the raster data buffer. Then, the print control unit 140 controls the printing mechanism 200 to form an image on a printing medium such as paper based on the read out raster data.

Operation of Intermediate Language Code Generation Unit 120

The following is a detailed description of parallelization of processing by the intermediate language code generation unit 120.

Figure 4:
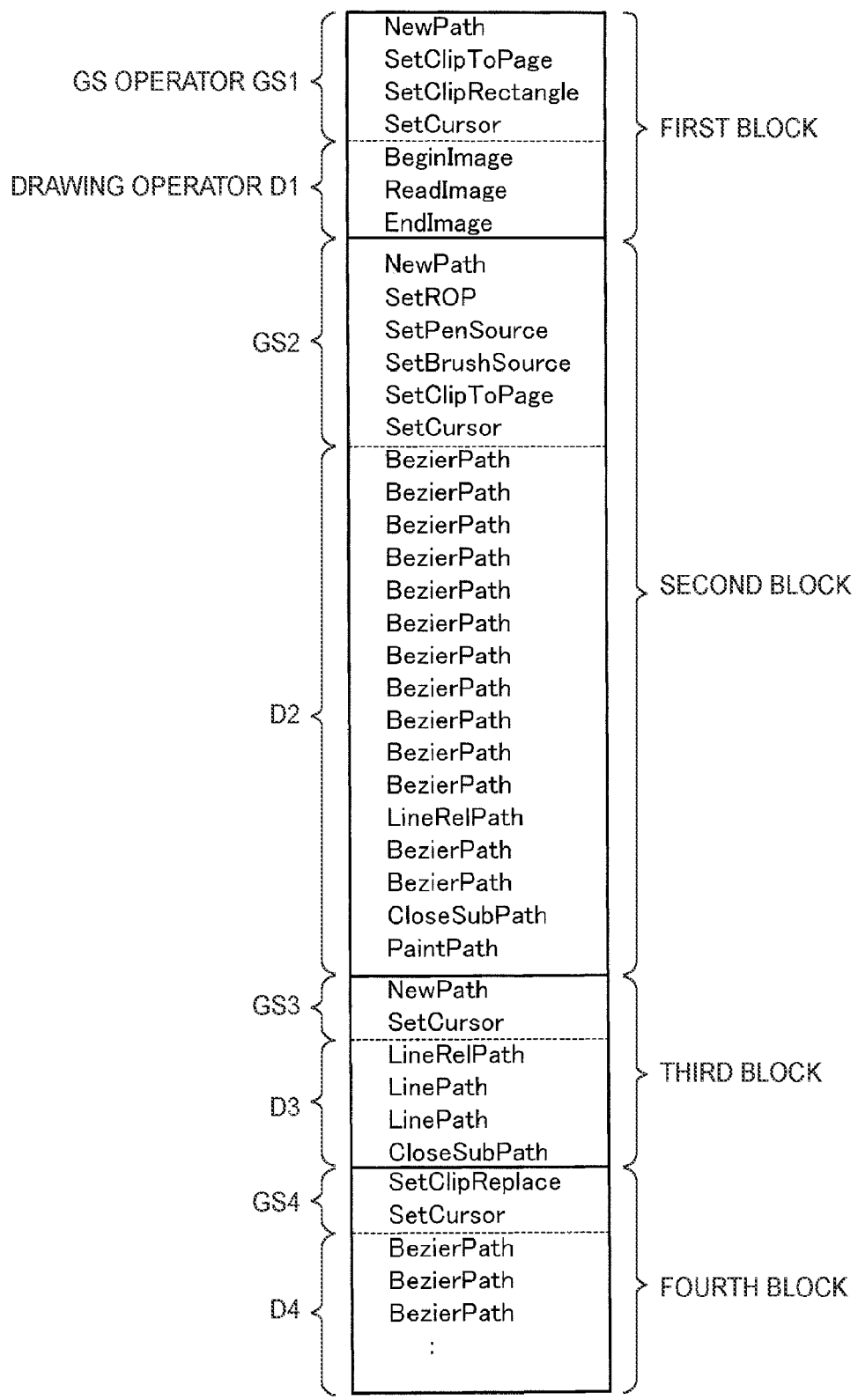
FIG. 4 describes an exemplary configuration of blocks in a drawing command according to embodiments of the present invention.

FIG. 4 describes an exemplary configuration of blocks in a drawing command and illustrates a pair of continuous GS operator and drawing operator configures a block in the drawing command. In the example shown in FIG. 4, four blocks (first to fourth blocks) are described. The first block includes GS operator GS1 and drawing operator D1, the second block includes GS operator GS2 and drawing operator D2, the third block includes GS operator GS3 and drawing operator D3, and the fourth block includes GS operator GS4 and drawing operator D4.

The intermediate language code generation unit 120 divides a drawing command into the above-stated units of blocks in principle. Then, the processing of generating an intermediate language code is allocated to the respective CPUs in the units of the blocks for parallel processing. Many drawing operators, however, use a coordinate value at the time when the immediately preceding operator finishes. Such operators cannot be processed in parallel, and have to be processed sequentially. Thus, the intermediate language code generation unit 120 of the embodiment of the present invention takes note of a setting position of a coordinate value, and divides a drawing command while setting a position to set a coordinate newly as a division position.

The following describes a method of dividing a drawing command in detail. First, the division in the units of blocks will be described. In the case where a drawing command is divided into blocks, drawing operators of different blocks are processed in parallel. As described above, however, the setting of a coordinate for drawing depends on an execution result of the previous operator, and therefore when the CPUs try to execute drawing operators of the respective blocks, all GS operators of blocks prior to the block to be executed has to be executed. For instance, suppose the drawing command illustrated in FIG. 4 is processed in parallel using four CPUs. At this time, a CPU executing drawing operator D1 executes GS operator GS1. A CPU executing drawing operator D2 executes GS operators GS1 and GS2. A CPU executing drawing operator D3 executes GS operators GS1, GS2 and GS3. A CPU executing drawing operator D4 executes all GS operators GS1, GS2, GS3 and GS4.

Herein, as for the drawing command of FIG. 4, a comparison is made for the number of processing steps between the case of parallel processing as stated above and the case of one-by-one or serial processing by a single CPU. As illustrated in the drawing, the number of processing steps to execute GS operator GS1 is 4, the number of processing steps to execute drawing operator D1 is 3, the number of processing steps to execute GS operator GS2 is 6, the number of processing steps to execute drawing operator D2 is 16, the number of processing steps to execute GS operator GS3 is 2, the number of processing steps to execute drawing operator D3 is 4, the number of processing steps to execute GS operator GS4 is 2, and the number of processing steps to execute drawing operator D4 is 10.

In the case of parallel processing using four CPUs, the number of processing steps is 7 (=GS1+D1) for the CPU executing drawing command D1. The number of processing steps is 26 (=GS1+GS2+D2) for the CPU executing drawing command D2. The number of processing steps is 16 (=GS1+GS2+GS3+D3) for the CPU executing drawing command D3. The number of processing steps is 24 (=GS1+GS2+GS3+GS4+D4) for the CPU executing drawing command D4. Therefore, the maximum number 26 of processing steps among them will be the processing step number for parallel processing of the drawing command of FIG. 4.

On the other hand, in the case of serial processing, the number of processing steps to execute GS operators GS1 to GS4 and drawing operators D1 to D4 are simply added, which will be 47. Thus, the parallel processing using four CPUs can finish with less number of processing steps than in serial processing even when each of the CPUs has to execute GS operators of all blocks prior to the block to be processed. Although the comparison is simply made for the number of processing steps, the time required to process each operator is longer in a drawing operator than in a GS operator in the actual processing. Therefore, the parallel processing can significantly shorten the time required for processing.

In a preferred embodiment of the present invention, all blocks are processed in parallel as stated above. In some cases, however, where a drawing operator depends on an execution result of a drawing operator of another block, the two blocks cannot be processed in parallel. In this case, the above-stated division position for blocks has to be corrected, so that a plurality of blocks that cannot be processed in parallel are collectively allocated to one CPU. From this aspect, in order to determine whether blocks can be processed in parallel or not, the embodiment of the present invention classifies GS operators and drawing operators configuring blocks into four types of a concluded type drawing operator, a normal drawing operator, a coordinate setting GS operator, and a normal GS operator.

Of the drawing operators, the concluded type drawing operator gives a coordinate to an operand (argument) of an operator. It does not depend on the processing of the immediately preceding process. For instance, in PCL-XL, drawing operators such as Pie, Rectangle, RoundRectangle, Chord and Ellipse correspond thereto.

The normal drawing operator is a normal one that is not the concluded type drawing operator. As a coordinate value, "a value immediately before operator execution" is used. Therefore, the next drawing operator cannot be executed before the processing of the immediately preceding operator finishes.

Of GS operators, the coordinate setting GS operator sets a coordinate. For instance, in PCL-XL, GS operators such as NewPath and SetCursor correspond thereto.

All GS operators other than the coordinate setting GS operator are normal GS operators. That is, the normal GS operator performs various settings other than coordinates.

In the drawing command of FIG. 4, suppose that GS operator GS2 does not include the above-stated coordinate setting GS operator and the drawing operator G2 does not begin with the above-stated concluded type drawing operator. In this case, a drawing start coordinate by the leading operator of drawing operator D2 depends on all of GS operator GS1, drawing operator D1, and GS operator GS2. That is, the drawing by drawing operator D2 cannot be executed before the drawing by drawing operator D1 finishes, and therefore they cannot be processed in parallel. In such a case, the intermediate language code generation unit 120 collectively allocates the first block and the second block to one CPU. The CPU executes operators of the first block and the second block sequentially. Once the division position is corrected so as to allocate a plurality of blocks to one CPU, the plurality of blocks simultaneously allocated to this one CPU can be dealt with as one block in the later processing.

Method to Improve the Allocation of Operators with Consideration Given to Time Required for Processing As stated above, intermediate language codes for each page can be generated by parallel processing. The following considers a method to improve the allocation of operators, thus further making it effective to generate an intermediate language code.

First, the following describes a method to allocate blocks to CPUs with consideration given to the time required for processing.

In the actual processing, the time required to process each operator is longer in a drawing operator than in a GS operator as stated above. Thus, the embodiment of the present invention expects a time required for processing based on types of operators in a block, and eases the parallelization of processing without increasing the processing time.

The time required to execute each operator does not vary greatly for the same type of operators, which are not exactly the same. Thus, an average processing time is measured in advance for each type of operators, and a processing time table is created. This processing time table is stored in the ROM 160 beforehand. With respect to individual operators decoded by the data decoding unit 110, the intermediate language code generation unit 120 refers to this processing time table to find an average processing time therefor, and calculates an expected processing time of the block (adds the average processing time of each operator in the block).

The following considers the case where the first block and the second block of the drawing command of FIG. 4 are allocated to one CPU as stated above. In this case, an expected processing time required to execute operators in these two blocks (hereinafter described as the first to second blocks) will be substantially longer than an expected processing time of each of the third block and the fourth block. Thus, if the total of the expected processing time of the third block and the fourth block is longer than the expected processing time of the first to second blocks, the third block and the fourth block are collectively allocated to one CPU. Thus, the first block to the fourth block can be allocated to two CPUs without increasing the entire expected processing time. In the case of the control unit 100 with four CPUs, two CPUs still remain, and therefore the following block in the page and blocks in the following page can be allocated to the remaining CPUs for processing.

Method to Improve the Allocation of Operators with Consideration Given to Memory Usage The following describes a method to allocate blocks to CPUs with consideration given to memory usage during the processing by the intermediate language code generation unit 120.

The time required for a processing to convert operators in a drawing command into an intermediate language code itself can be shortened by the allocation to a plurality of CPUs for parallel processing as stated above. However, if a memory size required for the processing exceeds the free space of the memory 150 of the control unit 100, data stored in the memory 150 has to be compressed or be saved in a magnetic disk or the like so as to expand the free space. This expanding process of the free space degrades the processing efficiency of the intermediate language code generation unit 120. Thus, in the embodiment of the present invention, a memory size required for processing by the intermediate language code generation unit 120 is expected, and allocation of blocks to CPUs is conducted so that this memory size will not exceed a free space of the memory 150.

In a part of a block describing GS operators, the maximum memory usage (upper limit) is a fixed value irrespective of the number of GS operators described. This is because the memory usage of a GS operator is decided by a size of a structure thereof. Therefore, the memory usage of a GS operator part can be calculated precisely.

On the other hand, as for a part describing drawing operators, a memory size required therefor varies depending on the number of drawing operators described (a required memory size increases with an increase in the number of operators). Further, a memory size required for execution varies depending on types of operators. A required memory size does not vary greatly for the same type of operators, which are not exactly the same although. Then, an average of a required memory size is calculated for each type of operator, and a memory use expectation table 161 is created. This memory use expectation table 161 is stored beforehand in the ROM 160. With respect to individual operators decoded by the data decoding unit 110, the intermediate language code generation unit 120 refers to this memory use expectation table 161 to find an average of the required memory size, and calculates a memory usage for a drawing operator part of the block (adds the average of the memory size required to execute each drawing operator in the block). This memory usage of the drawing operator part and the above-stated memory usage of the GS operator part are added, thus obtaining an expected memory usage of the block. Note here that the memory usage for the GS operator part may be stored in the memory use expectation table 161 together with the required memory size for drawing operators.

Figure 5:
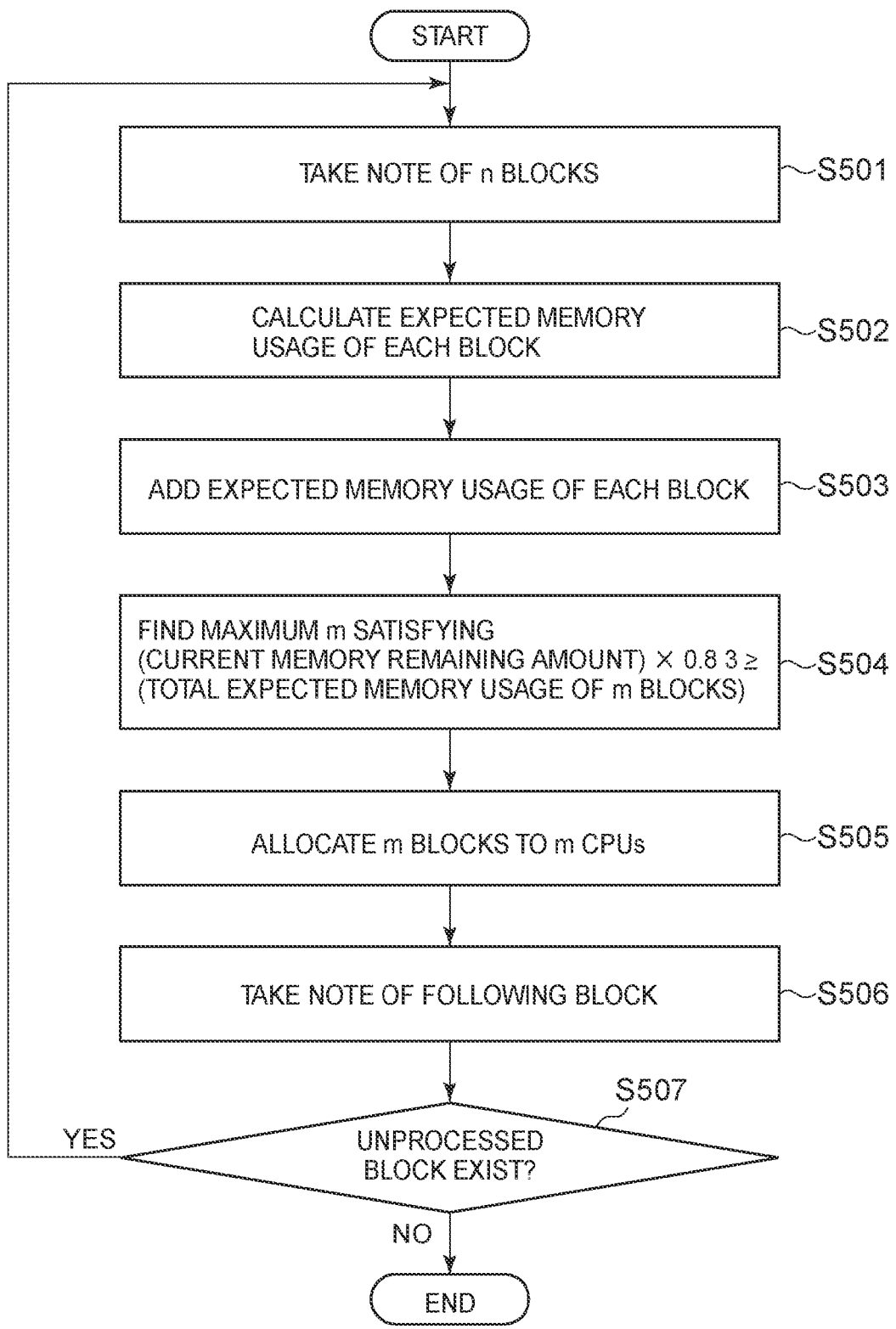
FIG. 5 is a flowchart briefly illustrating the procedure to allocate blocks with consideration given to memory usage according to embodiments of the present invention.

FIG. 5 is a flowchart briefly illustrating the procedure to allocate blocks with consideration given to memory usage. First, the intermediate language code generation unit 120 takes note of n pieces of blocks as a target of the allocation (Step 501). Herein, n is the number of CPUs. The n pieces of blocks are called a first block, a second block, and so on in this order. Next, the intermediate language code generation unit 120 refers to the memory use expectation table 161 to calculate an expected memory usage of each block (Step 502).

Next, the intermediate language code generation unit 120 adds the expected memory usage of each block from the first block one by one (Step 503), and finds the maximum m satisfying Expression (1) (Step 504):

(Current memory remaining amount)×0.8≧
(total expected memory usage of *m* pieces of
blocks). Expression (1)

That is, as a threshold for an expected memory usage enabling parallel processing, a dynamic value (in this example, a value obtained by multiplying by 0.8) is set with reference to the current memory remaining amount. In this case, the memory remaining amount refers to the free space of the memory 150. Further, m≦n. If the memory remains sufficiently, m=n. In order to make allowance for the memory usage even when the total expected memory usage is the maximum, the memory remaining amount is multiplied by 0.8. This value for multiplying of the memory remaining amount can be freely set to set a threshold of the expected memory usage. For instance, this value may be made smaller so as to prevent the processing (overhead) to deal with memory shortage from occurring frequently.

Thereafter, based on the found value of m, m pieces of blocks are allocated to m CPUs (Step 505) to execute the processing to generate an intermediate language code by parallel processing. Then, the intermediate language code generation unit 120 takes note of the following block (Step 506), and repeats the processing of Step 501 or later until all of the blocks configuring the page being processed has been processed (Step 507).

The following is a specific description of the allocation of blocks with consideration given to memory usage by exemplifying the drawing command of FIG. 4.

FIG. 6 illustrates a required memory size of each operator and an expected memory usage of each block in the drawing command of FIG. 4. Note that a value of the memory size of FIG. 6 shows a relative value among operators, and does not show a specific unit (e.g., byte).

In the example of FIG. 6, the memory usage of the GS operator part is set at 100. A value of the required memory size of each drawing operator is obtained by referring to the above-stated memory use expectation table 161. Expected memory usage for each block, which is obtained by adding the required memory size of each operator, of the first block, the second block, the third block, and the fourth block is 1120, 820, 160, and 1520, respectively. Thus, the total expected memory usage from the first block to the fourth block is 3620, and the total expected memory usage from the first block to the third block is 2100.

Suppose the free space of the memory 150 is 3000. Then, since 3000×0.8<3620, the total expected memory usage from the first block to the fourth block exceeds the free space of the memory 150. On the other hand, since 3000×0.8<2100, the total expected memory usage from the first block to the third block is within the free space of the memory 150. Therefore, in order to avoid the processing (overhead) to deal with memory shortage, the first to the third blocks are allocated to three CPUs for parallel processing. At this time, one CPU is in an idle state, which waits for the allocation of the next block.

Pointer Table

As stated above, blocks configuring each page of a drawing command are allocated to a plurality of CPUs, and an intermediate language code is generated by parallel processing. The thus generated intermediate language code is stored in the intermediate language buffer (memory 150). Herein, since the intermediate language code is generated by parallel processing of blocks, the intermediate language code obtained is divided into the blocks. Thus, the intermediate language code generation unit 120 in the embodiment of the present invention creates the pointer table 151 to manage the order of the blocks in the original drawing command. That is, the pointer table 151 keeps correspondence information that associates a plurality of intermediate language code groups generated at the same time by parallel processing with their orders of blocks in the original drawing command.

The pointer table 151 is stored in the intermediate language buffer (memory 150) together with the intermediate language code of blocks generated by the above-stated procedure. A division position of the drawing command may be corrected so as to allocate a plurality of blocks to one CPU actually. In this case, the entire blocks allocated to one CPU are registered as one block in the pointer table 151.

Figure 7:
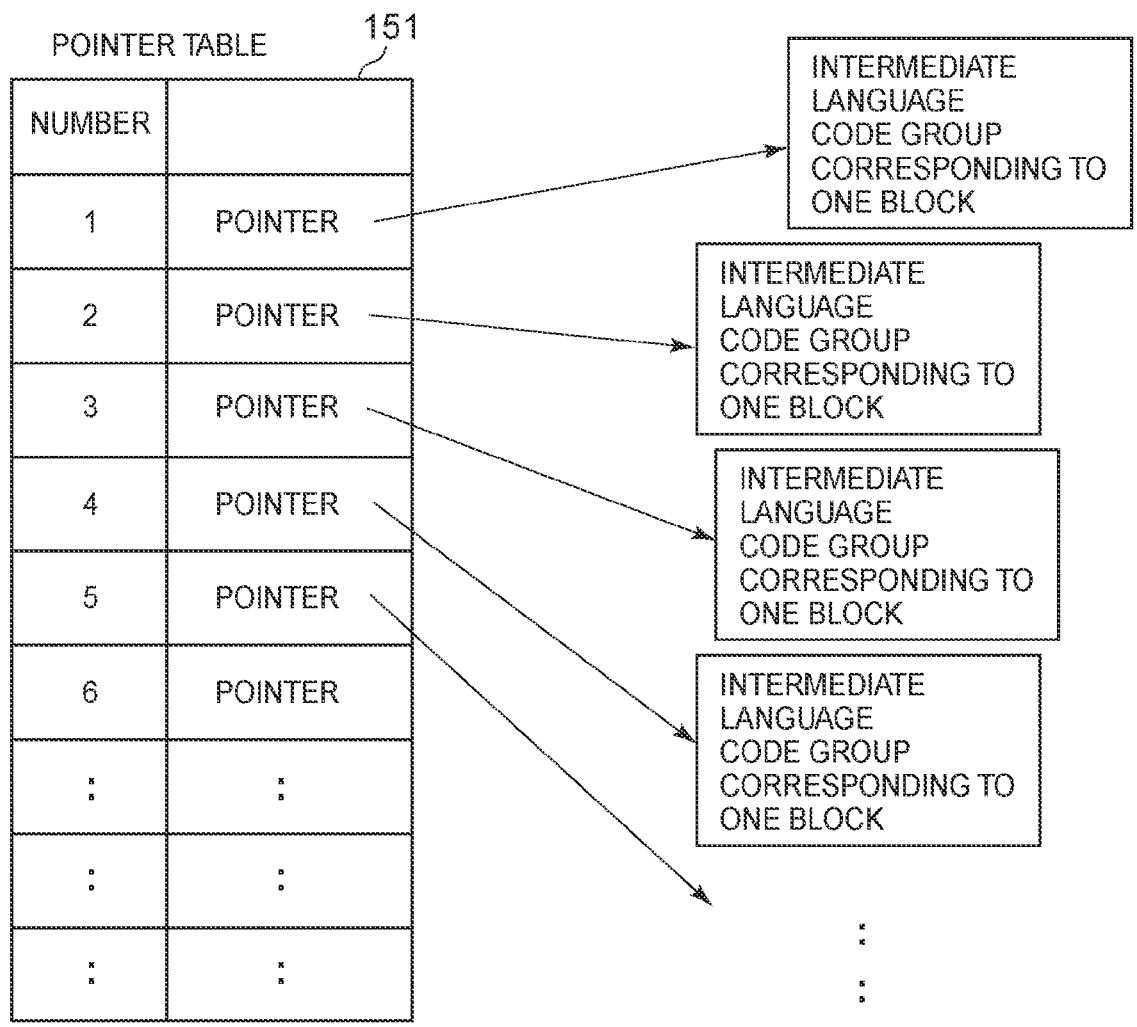
FIG. 7 illustrates an exemplary configuration of a pointer table according to embodiments of the present invention.

FIG. 7 illustrates an exemplary configuration of the pointer table 151. As illustrated in FIG. 7, the pointer table 151 associates pointers to intermediate language code groups of blocks with serial numbers. The serial number is associated with the order of the intermediate language codes in the original drawing command, thus registering pointers in the table. Thus, the intermediate language processing unit 130 can acquire the intermediate language codes in the order in the original drawing command by reading out an intermediate language code group designated by a pointer from the intermediate language buffer in the order of the serial number of the pointer table 151.

Flow of Operation by Control Unit 100

The following describes the overall flow of an operation by the control unit 100.

FIGS. 8-1 and 2 are flowcharts illustrating the overall flow of an operation by the control unit 100. The following description is based on an exemplary case including four CPUs performing parallel processing. FIGS. 8-1 and 2 illustrate an operation of processing a drawing command of one page among the drawing commands as a printing target for printout. The processing based on a stream header and a start page of each page is similar to the processing by control means of the existing printing device, and therefore the description therefor has been omitted.

The intermediate language code generation unit 120 of the control unit 100 first initializes variable BLOCKNUM and variable CPU_N (Step 801). Herein, variable BLOCKNUM is a variable to store the serial number of a block currently being processed. Variable CPU_N is a variable indicating how many CPUs are used, that is, how many blocks are written on the intermediate language buffer. This CPU_N is one variable that all CPUs can access commonly.

Next, the intermediate language code generation unit 120 of the control unit 100 reads operators of the drawing command kept in the data receiving buffer (memory 150) via the data decoding unit 110 one by one from the leading block of the page as the current processing target, and allocates them to CPUs. In this exemplary operation, since four CPUs are included, a drawing command corresponding to four blocks at maximum can be processed in parallel. Then, the drawing command corresponding to four blocks at maximum is read one by one for processing. In the following, four blocks that the intermediate language code generation unit 120 can read in one cycle processing are block #1, block #2, block#3 and block#4 in this order. Four CPUs configuring the control unit 100 are CPU 101, CPU 102, CPU 103 and CPU 104.

Referring to FIG. 8-1, the intermediate language code generation unit 120 first reads block#1 by one-block reading processing (Step 802). Then, memory usage expectation processing is conducted with respect to the read block#1 (Step 803). The detailed procedure of the one-block reading processing and the memory usage expectation processing will be described later.

Next, the intermediate language code generation unit 120 reads block#2 by one-block reading processing (Step 804), followed by memory usage expectation processing with respect to the read block#2 (Step 805). Then, the intermediate language code generation unit 120 determines whether the total of the expected memory usage of blocks#1 and #2 satisfies Expression (1) described referring to FIG. 5 or not. Herein, since two blocks are read at Step 802 and Step 804, the value of m in Expression (1) is 2. If the total of the expected memory usage of blocks#1 and #2 does not satisfy Expression (1) (No at Step 806), the intermediate language code generation unit 120 returns data of block#2 read at Step 804 to the data receiving buffer (Step 807). After this, the intermediate language code generation unit 120 processes one block (block#1) as a target in this cycle.

If the total of the expected memory usage of blocks#1 and #2 satisfies Expression (1) (Yes at Step 806), next the intermediate language code generation unit 120 reads block#3 by one-block reading processing (Step 808), and subsequently performs memory usage expectation processing with respect to the read block#3 (Step 809). Then, the intermediate language code generation unit 120 determines whether the total of the expected memory usage of blocks#1 to #3 satisfies Expression (1) described referring to FIG. 5 or not. In this case, since one more block is read at Step 808, the value of m in Expression (1) is 3. If the total of the expected memory usage of blocks#1 to #3 does not satisfy Expression (1) (No at Step 810), the intermediate language code generation unit 120 returns data of block#3 read at Step 808 to the data receiving buffer (Step 811). After this, the intermediate language code generation unit 120 processes two blocks (blocks#1 and #2) as a target in this cycle.

If the total of the expected memory usage of blocks#1 to #3 satisfies Expression (1) (Yes at Step 810), next the intermediate language code generation unit 120 reads block#4 by one-block reading processing (Step 812), and subsequently performs memory usage expectation processing with respect to the read block#4 (Step 813). Then, the intermediate language code generation unit 120 determines whether the total of the expected memory usage of blocks#1 to #4 satisfies Expression (1) described referring to FIG. 5 or not. In this case, since one more block is read at Step 812, the value of m in Expression (1) is 4. If the total of the expected memory usage of blocks#1 to #4 does not satisfy Expression (1) (No at Step 814), the intermediate language code generation unit 120 returns data of block#4 read at Step 812 to the data receiving buffer (Step 815). After this, the intermediate language code generation unit 120 processes three blocks (blocks#1 to #3) as a target in this cycle. On the other hand, if the total of the expected memory usage of blocks#1 to #4 satisfies Expression (1) (Yes at Step 814), the intermediate language code generation unit 120 processes all of the read four blocks (blocks#1 to #4) as a target.

In the above-stated operation, the method to implement operations represented by the descriptions of reading a block, returning data of a block to the data receiving buffer and the like is not limited. That is, in these operations, data is not always moved or copied in the memory 150. For instance, as a possible operation implementing them, a pointer may be prepared indicating to what part of a series of drawing command kept in the memory 150 has been read, and this pointer may be operated.

Next, with reference to FIG. 8-2, if block#1 only is a processing target (No at Step 806 and after Step 807), the intermediate language code generation unit 120 allocates block#1 to CPU 101, and generates intermediate language codes corresponding to operators of this block#1 (Step 816). Then, the intermediate language code generation unit 120 stores the generated intermediate language code group in the intermediate language buffer (memory 150). Further, pointers to the stored intermediate language code group are written in entries of the serial number "BLOCKNUM+1" of the pointer table 151 (Step 817). Thereafter, the intermediate language code generation unit 120 adds 1 to the value of variable CPU_N so as to be a new variable CPU_N (Step 818).

Next, if blocks#1 and #2 are a processing target (No at Step 810 and after Step 811), the intermediate language code generation unit 120 allocates block#1 to CPU 101, allocates block#2 to CPU 102, and generates intermediate language codes corresponding to operators of these blocks#1, #2 by parallel processing (Step 819). Then, the intermediate language code generation unit 120 stores the generated intermediate language code group in the intermediate language buffer (memory 150). Further, pointers to the intermediate language code group corresponding to the operators of block#1 are written in entries of the serial number "BLOCKNUM+1" of the pointer table 151, and pointers to the intermediate language code group corresponding to the operators of block#2 are written in entries of the serial number "BLOCKNUM+2" (Step 820). Thereafter, the intermediate language code generation unit 120 adds 2 to the value of variable CPU_N so as to be a new variable CPU_N (Step 821).

Next, if blocks#1 to #3 are a processing target (No at Step 814 and after Step 815), the intermediate language code generation unit 120 allocates block#1 to CPU 101, allocates block#2 to CPU 102, allocates block#3 to CPU 103, and generates intermediate language codes corresponding to operators of these blocks#1 to #3 by parallel processing (Step 822). Then, the intermediate language code generation unit 120 stores the generated intermediate language code group in the intermediate language buffer (memory 150). Further, pointers to the intermediate language code group corresponding to the operators of block#1 are written in entries of the serial number "BLOCKNUM+1" of the pointer table 151, pointers to the intermediate language code group corresponding to the operators of block#2 are written in entries of the serial number "BLOCKNUM+2", and pointers to the intermediate language code group corresponding to the operators of block#3 are written in entries of the serial number "BLOCKNUM+3" (Step 823). Thereafter, the intermediate language code generation unit 120 adds 3 to the value of variable CPU_N so as to be a new variable CPU_N (Step 824).

Next, if blocks#1 to #4 are a processing target (Yes at Step 814), the intermediate language code generation unit 120 allocates block#1 to CPU 101, allocates block#2 to CPU 102, allocates block#3 to CPU 103, allocates block#4 to CPU 104, and generates intermediate language codes corresponding to operators of these blocks#1 to #4 by parallel processing (Step 825). Then, the intermediate language code generation unit 120 stores the generated intermediate language code group in the intermediate language buffer (memory 150). Further, pointers to the intermediate language code group corresponding to the operators of block#1 are written in entries of the serial number "BLOCKNUM+1" of the pointer table 151, pointers to the intermediate language code group corresponding to the operators of block#2 are written in entries of the serial number "BLOCKNUM+2", pointers to the intermediate language code group corresponding to the operators of block#3 are written in entries of the serial number "BLOCKNUM+3", and pointers to the intermediate language code group corresponding to the operators of block#4 are written in entries of the serial number "BLOCKNUM+4" (Step 826). Thereafter, the intermediate language code generation unit 120 adds 4 to the value of variable CPU_N so as to be a new variable CPU_N (Step 827).

At any of Steps 818, 821, 824, and 827, after updating the variable CPU_N, the intermediate language code generation unit 120 adds the value of the updated variable CPU_N to the value of variable BLOCKNUM so as to be a new variable BLOCKNUM (Step 828), thus initializing the variable CPU_N (Step 829). Then, the intermediate language code generation unit 120 determines whether the processing corresponding to one page has finished or not. If it has not finished (No at Step 830), the intermediate language code generation unit 120 returns to Step 802 to repeat the above-stated processing.

If the processing corresponding to one page has finished (Yes at Step 830), next the intermediate language processing unit 130 of the control unit 100 executes intermediate language drawing processing to generate raster data from the intermediate language code group (Step 831). The procedure of the intermediate language drawing processing will be described later. The raster data generated by the intermediate language drawing processing is stored in the raster data buffer (memory 150).

Next, the print control unit 140 of the control unit 100 reads out raster data of images corresponding to one page from the raster data buffer, and controls the printing mechanism 200 to form the images on a printing medium such as paper for printout (Step 832). In the case where documents as a printing target are spread over a plurality of pages, the above-stated processing is repeated corresponding to the number of pages.

One-Block Reading Processing

Figure 9:
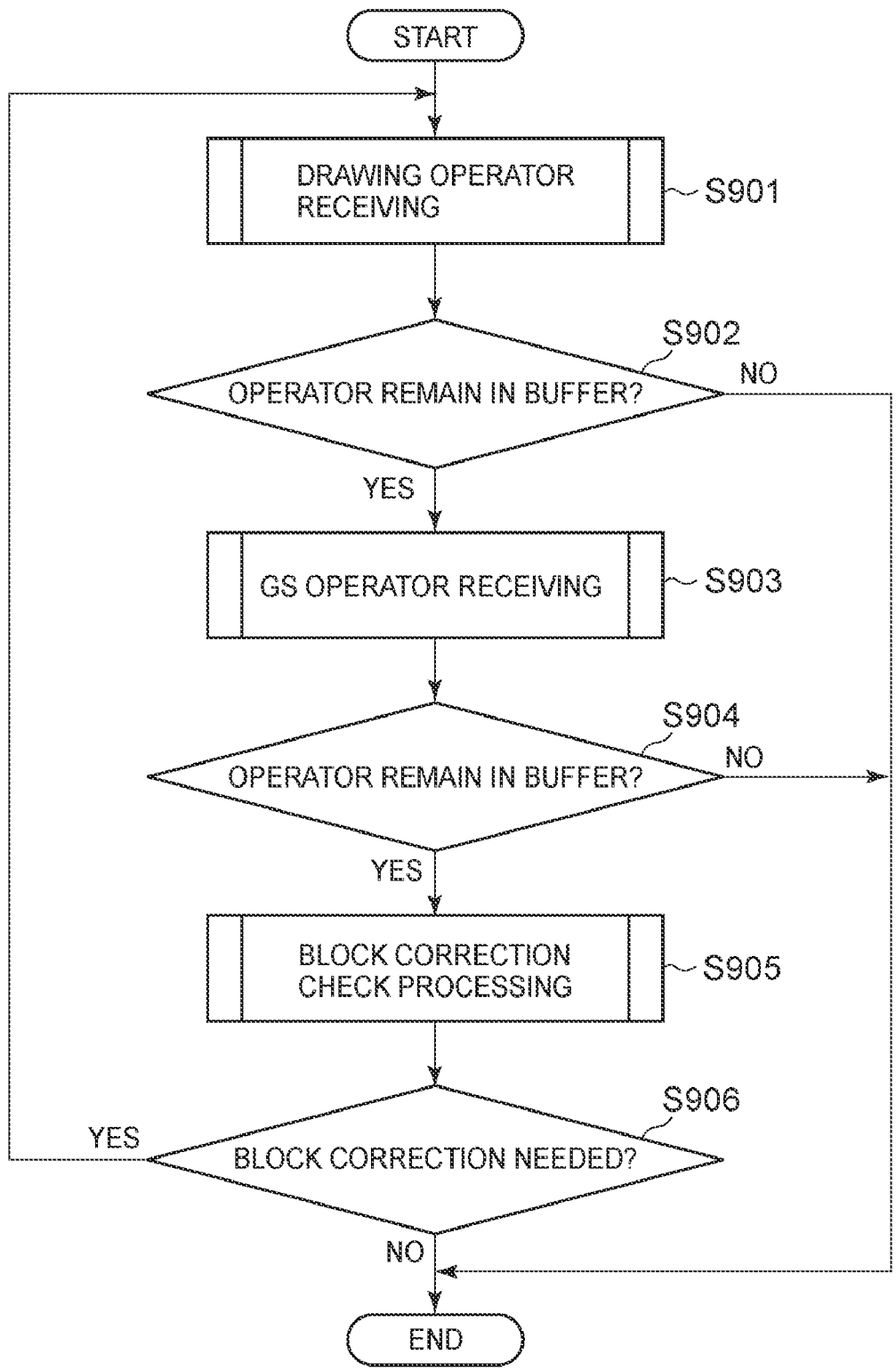
FIG. 9 is a flowchart of one-block reading processing indicated as Steps 802, 804, 808, and 812 of FIG. 8-1.

FIG. 9 is a flowchart of the one-block reading processing indicated as Steps 802, 804, 808, and 812 of FIG. 8-1. Referring to FIG. 9, in the one-block reading processing, the intermediate language code generation unit 120 first executes GS operator receiving processing (Step 901), and determines whether operators remain in the data receiving buffer. If any operators remain (Yes at Step 902), next the intermediate language code generation unit 120 executes drawing operator receiving processing (Step 903), and determines whether operators remain in the data receiving buffer. If any operators remain (Yes at Step 904), next the intermediate language code generation unit 120 executes division position check processing (Step 905). The procedure of the above-stated GS operator receiving processing, drawing operator receiving processing, and division position check processing will be described later.

After the GS operator receiving processing or the drawing operator receiving processing, if any operators do not remain (No at Step 902, or No at Step 904), the intermediate language code generation unit 120 finishes the one-block reading processing. As a result of the division position check processing, if there is no need to correct the division position also (No at Step 906), the intermediate language code generation unit 120 finishes the one-block reading processing. On the other hand, if there is a need to correct the division position (Yes at Step 906), the intermediate language code generation unit 120 returns to Step 901 to repeat the above-stated operations.

Drawing Operator Receiving Processing

Figure 10:
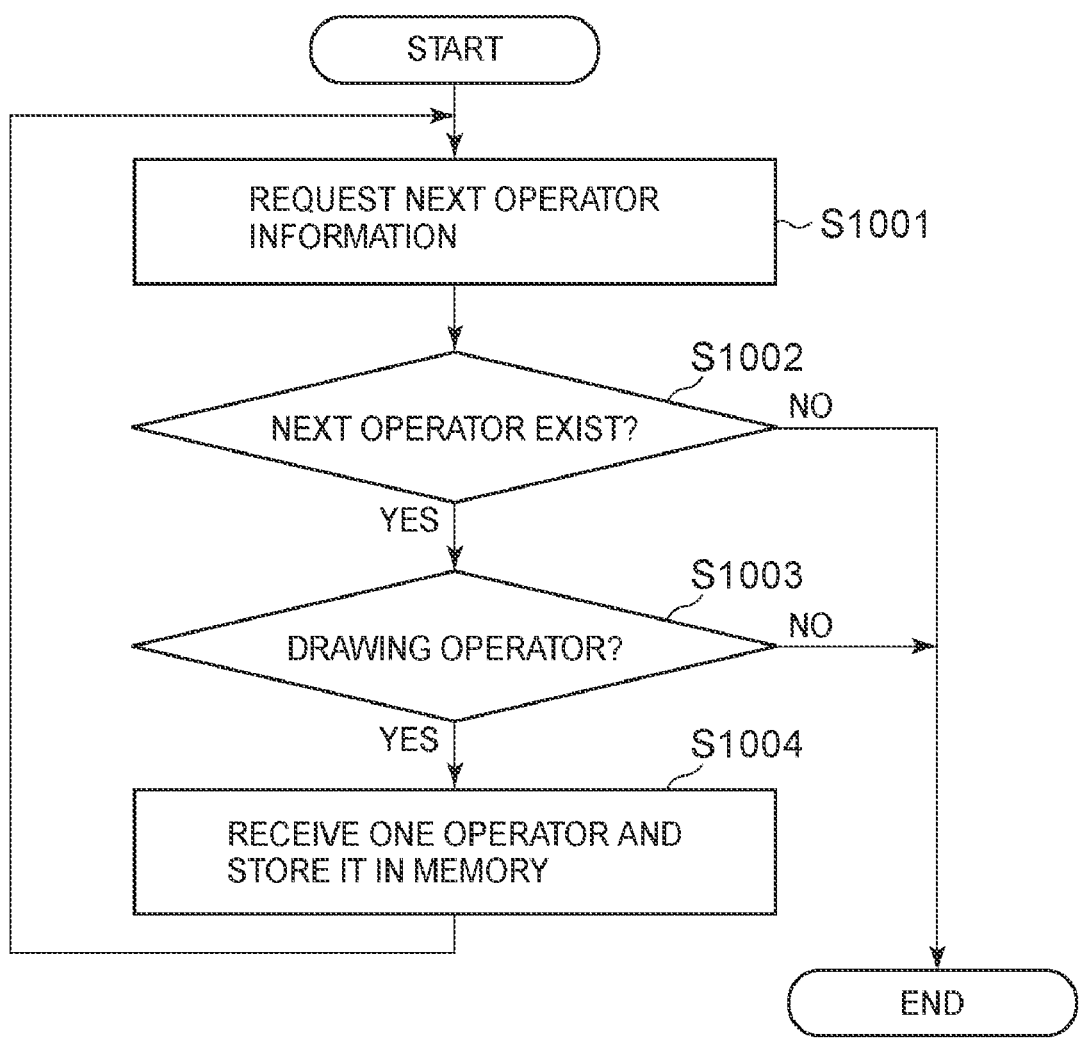
FIG. 10 is a flowchart illustrating the procedure of drawing operator receiving processing indicated as Step 901 of FIG. 9.

FIG. 10 is a flowchart illustrating the procedure of the drawing operator receiving processing indicated as Step 901 of FIG. 9. Referring to FIG. 10, in the drawing operator receiving processing, the intermediate language code generation unit 120 first requests information on the next operator from the data decoding unit 110 (Step 1001). If the next operator exists (Yes at Step 1002), and if the operator is a drawing operator (Yes at Step 1003), the intermediate language code generation unit 120 receives one of such an operator from the data decoding unit 110, and stores the same in a work area of the memory 150 (Step 1004). Then, the procedure returns to Step 1001 to repeat the processing.

If the next operator does not exist (No at Step 1002), and if the next operator exits but it is not a drawing operator (but a GS operator) (No at Step 1003), the intermediate language code generation unit 120 finishes the drawing operator receiving processing. Herein, in the above-stated processing, types of the operators may be determined by referring to a table stored in the ROM 160 or the like beforehand including classifications of the operators.

GS Operator Receiving Processing

Figure 11:
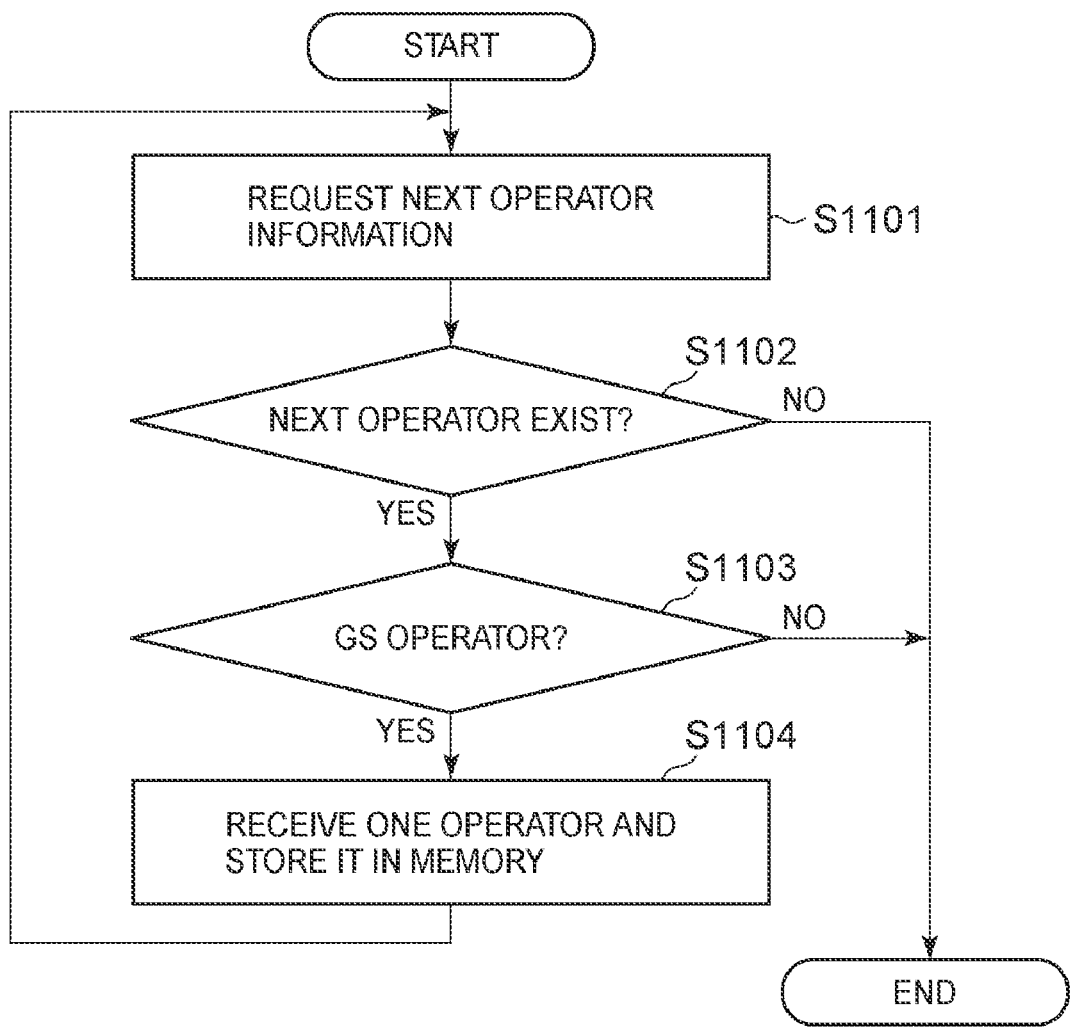
FIG. 11 is a flowchart illustrating the procedure of GS operator receiving processing indicated as Step 903 of FIG. 9.

FIG. 11 is a flowchart illustrating the procedure of the GS operator receiving processing indicated as Step 903 of FIG. 9. Referring to FIG. 11, in the GS operator receiving processing, the intermediate language code generation unit 120 first requests information on the next operator from the data decoding unit 110 (Step 1101). If the next operator exists (Yes at Step 1102), and if the operator is a GS operator (Yes at Step 1103), the intermediate language code generation unit 120 receives one of such an operator from the data decoding unit 110, and stores the same in a work area of the memory 150 (Step 1104). Then, the procedure returns to Step 1101 to repeat the processing.

If the next operator does not exist (No at Step 1102), and if the next operator exits but it is not a GS operator (but a drawing operator) (No at Step 1103), the intermediate language code generation unit 120 finishes the GS operator receiving processing. Herein, in the above-stated processing, types of the operators may be determined by referring to a table stored in the ROM 160 or the like beforehand including classifications of the operators.

Division Position Check Processing

Figure 12:
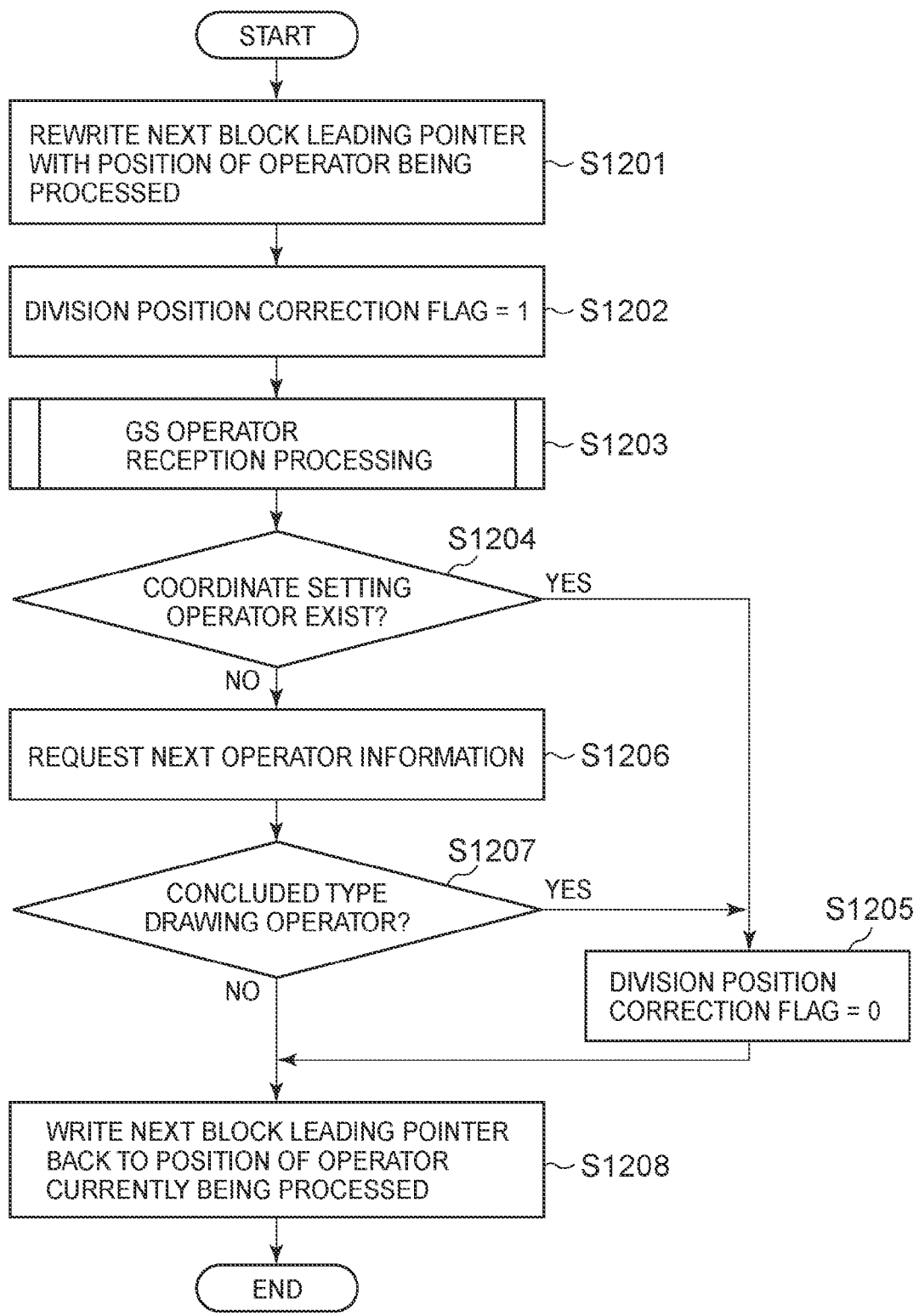
FIG. 12 is a flowchart illustrating the procedure of division position check processing indicated as Step 905 of FIG. 9.

FIG. 12 is a flowchart illustrating the procedure of the division position check processing indicated as Step 905 of FIG. 9. Referring to FIG. 12, in the division position check processing, the intermediate language code generation unit 120 first replaces a next block leading pointer indicating a leading operator of the next block with a value indicating a position of the operator being processed (Step 1201). Then, a value of a division position correction flag is set as a value indicating a need to correct (in FIG. 12, "1") (Step 1202).

Next, the intermediate language code generation unit 120 performs GS operator receiving processing (Step 1203). Then, the intermediate language code generation unit 120 determines whether a coordinate setting operator exists or not in the read GS operator. If a coordinate setting operator exists (Yes at Step 1204), the next block being noted can be processed in parallel with the block currently being processed (being read), and therefore the value indicating the division position correction flag is set as a value indicating no need to correct ("0" in FIG. 12) (Step 1205). Thus, the block currently being processed and the next block will be divided and processed in parallel. Next, the intermediate language code generation unit 120 rewrites a value of the next block leading pointer with a position of the operator currently being processed and finishes the division position check processing (Step 1208). To return the value of the next block leading pointer to the position of the operator currently being processed means to return a counter whose value proceeded to the original value because data has been read in the division position check processing.

If a coordinate setting operator does not exist in the read GS operator (No at Step 1204), the intermediate language code generation unit 120 further requests information on the next operator from the data decoding unit 110 (Step 1206). If the next operator exists and the operator is a concluded type drawing operator (Yes at Step 1207), the next block being noted can be processed in parallel with the block currently being processed, and therefore the value indicating the division position correction flag is set as "0" (Step 1205). Thus, the block currently being processed and the next block will be divided and processed in parallel. Next, the intermediate language code generation unit 120 rewrites a value of the next block leading pointer with a position of the operator currently being processed and finishes the division position check processing (Step 1208).

In the next block, if a coordinate setting operator does not exist in a GS operator (No at Step 1204) and if a concluded type drawing operator does not exist following this (No Step 1207), a drawing operator in the next block depends on an execution result of drawing operators of the block currently being processed, and therefore the block currently being processed and the next block cannot be processed in parallel. Thus, the value of the division position correction flag is not changed, whose value is still set as "1" at Step 1202. Thereby, the block currently being processed as well as the next block is not divided, and is read together in the one-block reading processing illustrated in FIG. 9, which becomes subjected to serial processing. Thereafter, the intermediate language code generation unit 120 replaces a value of the next block leading pointer with a position of the operator currently being processed and finishes the division position check processing (Step 1208).

Memory Usage Expectation Processing

Figure 13:
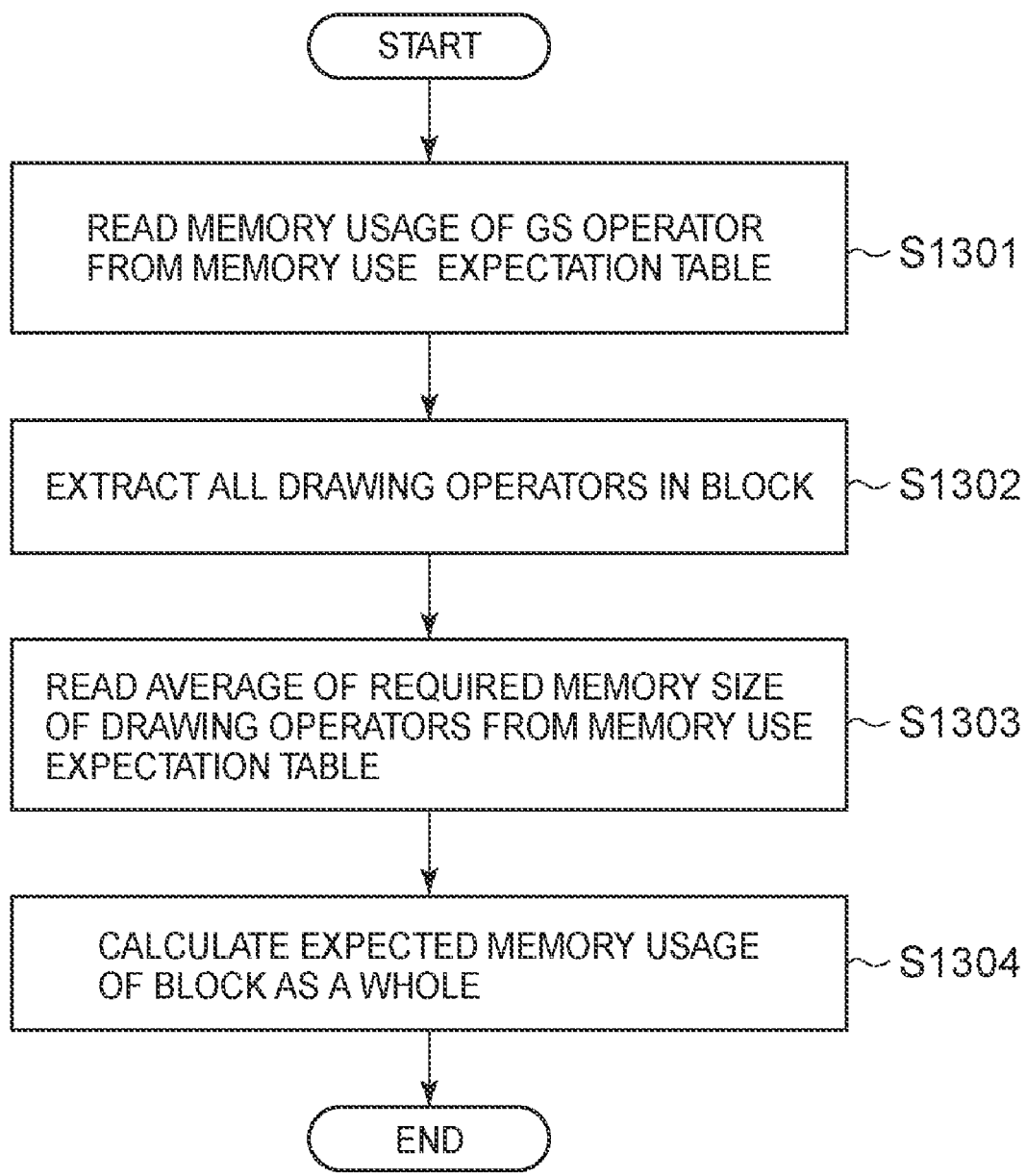
FIG. 13 is a flowchart illustrating the procedure of memory usage expectation processing indicated as Steps 803, 805, 809, and 813 of FIG. 8-1.

FIG. 13 is a flowchart illustrating the procedure of the memory usage expectation processing indicated as Steps 803, 805, 809, and 813 of FIG. 8-1. Referring to FIG. 13, in the memory usage expectation processing, the intermediate language code generation unit 120 first reads a memory usage of a GS operator from the memory use expectation table 161 (Step 1301). Next, the intermediate language code generation unit 120 extracts all drawing operators in the block being processed (Step 1302). At this time, a main body of the operator only is extracted, and drawing data coming with the operator is ignored.

Next, the intermediate language code generation unit 120 reads an average of a required memory size of the drawing operators extracted at Step 1302 from the memory use expectation table 161 (Step 1303). Next, the intermediate language code generation unit 120 adds the memory usage of the GS operator part acquired at Step 1301 and the average of the required memory size of each drawing operator acquired at Step 1303 to calculate an expected memory usage of the block as a whole (step 1304).

Figures 14, 15:
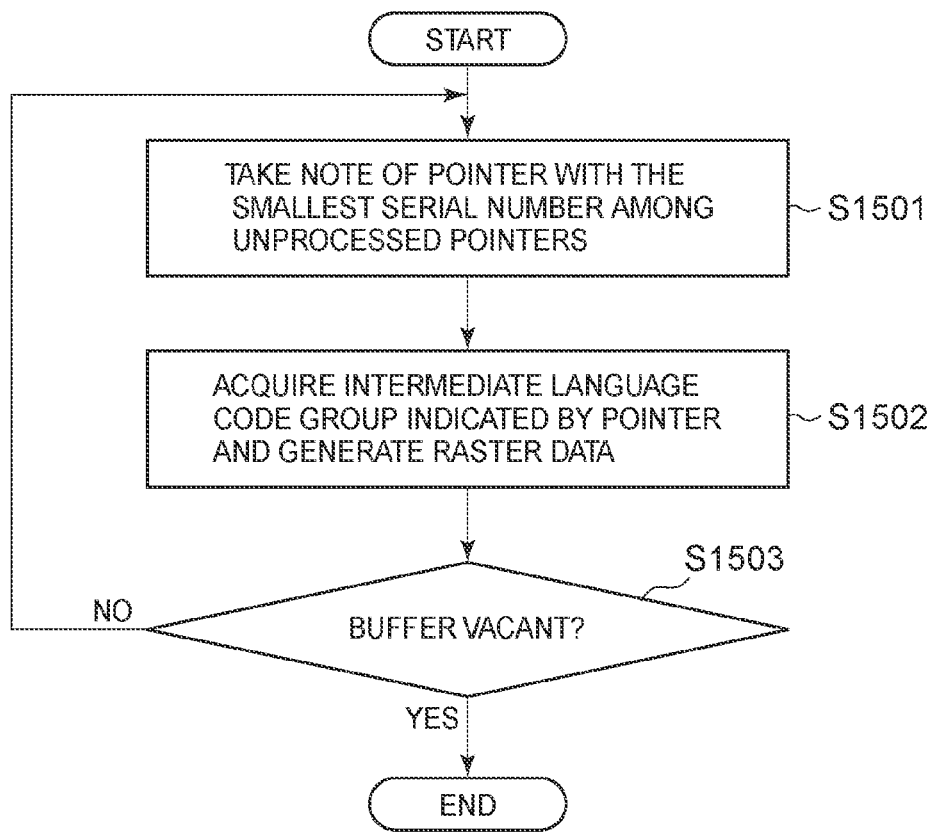
FIG. 14 illustrates an exemplary configuration of a memory use expectation table according to embodiments of the present invention.
FIG. 15 is a flowchart illustrating the procedure of intermediate language drawing processing indicated as Step 831 of FIG. 8-2.

FIG. 14 illustrates an exemplary configuration of the memory use expectation table 161. As illustrated in FIG. 14, the memory use expectation table 161 includes a memory usage of a GS operator part in one block and an expected memory usage of each drawing operator (an average of required memory/size) registered therein. The intermediate language code generation unit 120 refers to this memory use expectation table 161 to acquire information required at the above-stated Step 1301 and Step 1303.

Intermediate Language Drawing Processing

FIG. 15 is a flowchart illustrating the procedure of the intermediate language drawing processing indicated as Step 831 of FIG. 8-2. Referring to FIG. 15, in the intermediate language drawing processing, the intermediate language processing unit 130 first refers to the pointer table 151 kept in the memory 150 and takes note of a pointer with the smallest serial number among unprocessed pointers (Step 1501). Then, the intermediate language processing unit 130 reads out an intermediate language code group indicated by the pointer noted at Step 1501 from the intermediate language buffer (memory 150), and performs drawing processing (generates raster data) (Step 1502). The above-stated processing is performed on all intermediate language code groups stored in the intermediate language buffer, and when the intermediate language buffer becomes vacant, the intermediate language processing unit 130 finishes the intermediate language drawing processing (Step 1503).

The technical scope of the embodiments of the present invention is not limited to the scope described in the above embodiment. For instance, although the control unit 100 is configured with four CPUs in the above embodiment, the number of CPUs is not limited to the above-stated exemplary configuration. A multi-core processor equipped with a plurality of processor cores in one CPU may be used. In this case, the respective processor cores in the multi-core processor may be dealt with similarly to the individual CPUs in the above-stated embodiment. That is, a drawing command divided in the units of blocks is allocated to each processor core, which is converted into an intermediate language code by parallel processing with each processor core. It would be obvious from the recitation of claims that the technical scope of the present invention further covers the above-stated embodiment with various modification or improvement added thereto.

What is claimed is:

1. A computer-implemented printing device that receives a drawing command and printing data to produce a printout, comprising:
an intermediate language generation unit for acquiring said drawing command and said printing data written in a page description language and converting said drawing command and said printing data into an intermediate language code;
an intermediate language processing unit for processing said intermediate language code generated by said intermediate language generation unit to generate raster data; and
a printing mechanism for performing printing processing based on said raster data generated by said intermediate language processing unit,
wherein said intermediate language generation unit divides said drawing command into units of blocks, wherein each block of said units of blocks includes a group of drawing operators and graphic state operators, wherein said drawing operators designate images and wherein said graphic state operators are operators other than said drawing operators, based on a dependence between said units of blocks of said drawing operators and said graphic state operators, and performs parallel processing in said units of blocks to generate said intermediate language code.

2. The device according to claim 1, wherein said intermediate language generation unit performs, with respect to first and second continuous blocks of said units of blocks,
serial processing without dividing said first and second continuous blocks when said graphic state operators in said second does not include an operator setting a coordinate and a leading operator of said drawing operators in said second continuous block is not an operator having a coordinate as an argument, and
parallel processing while dividing said first and second continuous blocks in other cases.

3. The device according to claim 1, wherein, when said drawing operators and said graphic state operators in one block of said units of blocks are processed, said intermediate language generation unit processes said graphic state operators in a block that precedes said one block before processing said drawing operators and said graphic state operators in said one block.

4. The device according to claim 1,
wherein, when the time required to process a specific block of said units of blocks processed in parallel is determined to be longer than the time required to process other continuous blocks of said units of blocks, said intermediate language generation unit performs serial processing without dividing said other continuous blocks.

5. The device according to claim 1,
wherein, when an estimated memory usage required to perform parallel-processing of said units of blocks is larger than a threshold with reference to the free space of the physical memory, said intermediate language generation unit reduces the number of said units of blocks that are subjected to parallel processing.

6. The device according to claim 1,
wherein said intermediate language generation unit generates correspondence information that associates a plurality of intermediate language code groups generated by parallel processing with an original order of said units of blocks, and
said intermediate language processing unit processes said intermediate language code in said original order in said drawing command in accordance with said correspondence information.

7. The device according to claim 1, wherein said intermediate language generation unit is implemented by a multiprocessor that includes a plurality of CPUs, and allocates said units of blocks to said CPUs for parallel processing.

8. The device according to claim 1, wherein said intermediate language generation unit is implemented by a multicore processor including a plurality of processor cores provided for each CPU, and allocates said units of blocks to said processor cores for parallel processing.

9. A computer-implemented printing device that receives a drawing command and printing data and produces a printout, comprising:
an intermediate language generation unit for acquiring said drawing command and said printing data written in a page description language and converting said drawing command and said printing data into an intermediate language code;
an intermediate language processing unit for processing said intermediate language code generated by said intermediate language generation unit to generate raster data; and
a printing mechanism for performing printing processing based on said raster data generated by said intermediate language processing unit,
wherein said intermediate language generation unit performs the steps of:
(i) dividing said drawing command into units of blocks, wherein each block of said units of blocks includes a group of drawing operators and graphic state operators, said the drawing operators designate images and said graphic state operators are operators other than said drawing operators,
(ii) with respect to first and second continuous blocks of said units of blocks, serial processing without dividing said first and second continuous blocks when said graphic state operators in said second block does not include an operator setting a coordinate and a leading one of the drawing operators in said second block is not an operator having a coordinate as an argument, and parallel processing while dividing said two blocks in other cases,
(iii) when a time required to process a specific block of said units of blocks processed in parallel is determined to be longer than the time required to process other continuous blocks of said units of blocks, serial processing without dividing said other continuous blocks,
(iv) when an estimated memory usage required to parallel-processing of said units of blocks is larger than a threshold with reference to the free space of the physical memory, reducing the number of said units of blocks that are subjected to parallel processing,
(v) when said drawing operators and said graphic state operators in one block of said units of blocks are processed, processing said graphic state operators in a block that precedes said one block before processing said drawing operators and said graphic state operators in said one block to generate said intermediate language code, and (vi) generating correspondence information that associates a plurality of intermediate language code groups generated by parallel processing with an original order of said units of blocks, and (vii) processing said intermediate language code in said original order in said drawing command in accordance with said correspondence information.

10. A computer-implemented control device for a computer-implemented printing device that receives a drawing command and printing data and produces a printout, comprising:

an intermediate language generation unit for acquiring said drawing command and said printing data written in a page description language and converting said drawing command and said printing data into an intermediate language code; and an intermediate language processing unit for processing said intermediate language code generated by said intermediate language generation unit to generate raster data used for printing processing; and wherein said intermediate language generation unit divides said drawing command into units of blocks, wherein each block of said units of blocks includes a group of drawing operators and graphic state operators, wherein said drawing operators designate images and said graphic state operators are operators other than said drawing operators, based on a dependence between said units of blocks of said drawing operators and said graphic state operators, and performs parallel processing in said units of blocks to generate said intermediate language code.

11. The device according to claim 10, wherein said intermediate language generation unit performs, with respect to first and second continuous blocks of said units of blocks, serial processing without dividing said first and second continuous blocks when said graphic state operators in said second block does not include an operator setting a coordinate and a leading one of said drawing operators in said second block is not an operator having a coordinate as an argument, and parallel processing while dividing said first and second continuous blocks in other cases.

12. A computer-implemented control method of a computer-implemented printing device that receives a drawing command and printing data and produces a printout, comprising the steps of:

acquiring said drawing command and said printing data written in a page description language;

converting said acquired drawing command and said printing data into an intermediate language code;

processing said generated intermediate language code to generate raster data; and controlling a printing mechanism based on said generated raster data to perform printing processing, wherein said step of converting said acquired drawing command and said printing data into said intermediate language code includes the steps of:

dividing said drawing command into units of blocks, wherein each block of said units of blocks includes a group of drawing operators and graphic state operators, wherein said drawing operators designate images and said graphic state operators are operators other than said drawing operators, based on a dependence between said units of blocks of said drawing operators and said graphic state operators, and performing parallel processing in said units of blocks to generate said intermediate language code.

13. The method according to claim 12, wherein said step of dividing said drawing command, with respect to first and second continuous blocks of said units of blocks comprises:

performing serial processing without dividing said first and second continuous blocks when said graphic state operators in said second block does not include an operator setting a coordinate and a leading operator of said drawing operators in said second block is not an operator having a coordinate as an argument; and performing parallel processing while dividing said first and second continuous blocks in other cases.

14. A computer program product for controlling a printing device that receives a drawing command and printing data and produces a printout comprising a non-transitory computer readable article of manufacture tangibly embodying computer readable instructions which when executed causes a computer to carry out the steps of the method according to claim 12.

15. A computer program product for controlling a printing device that receives a drawing command and printing data and produces a printout comprising a non-transitory computer readable article of manufacture tangibly embodying computer readable instructions which when executed causes a computer to carry out the steps of the method according to claim 13.

* * * * *